(12) United States Patent
Yang

(10) Patent No.: US 11,794,723 B2
(45) Date of Patent: Oct. 24, 2023

(54) APPARATUS AND METHOD FOR CONTROLLING DRIVING OF VEHICLE

(71) Applicant: HYUNDAI MOBIS CO., LTD., Seoul (KR)

(72) Inventor: Jin Ho Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 129 days.

(21) Appl. No.: 17/485,743

(22) Filed: Sep. 27, 2021

(65) Prior Publication Data
US 2022/0111834 A1 Apr. 14, 2022

(30) Foreign Application Priority Data
Oct. 8, 2020 (KR) .......................... 10-2020-0130246
Oct. 20, 2020 (KR) .......................... 10-2020-0136214

(51) Int. Cl.
*B60W 30/045* (2012.01)
*B60W 30/14* (2006.01)

(52) U.S. Cl.
CPC ........ *B60W 30/045* (2013.01); *B60W 30/143* (2013.01); *B60W 2420/42* (2013.01);
(Continued)

(58) Field of Classification Search
CPC .............. B60W 30/045; B60W 30/143; B60W 2420/42; B60W 2552/40; B60W 2710/20;
(Continued)

(56) References Cited

U.S. PATENT DOCUMENTS 7,191,046 B2 * 3/2007 Kin ..................... B60T 8/1755
701/72
11,364,931 B2 * 6/2022 Lu .......................... G06T 9/002
(Continued)

FOREIGN PATENT DOCUMENTS

CN 103832435 A 6/2014
CN 108622186 A 10/2018
(Continued)

OTHER PUBLICATIONS

Extended European Search Report dated Mar. 7, 2022, in counterpart European Application No. 21200781.9 (8 pages in English).
(Continued)

*Primary Examiner* — Jeff A Burke
*Assistant Examiner* — Kyle T Johnson
(74) *Attorney, Agent, or Firm* — NSIP Law

(57) ABSTRACT

An apparatus and method for controlling driving of a vehicle includes a camera configured to acquire an image in front of a vehicle, a sensor configured to acquire a driving speed of the vehicle, a first neural network configured to calculate a compensation steering angle based on comparing a driving steering angle with a calculated steering angle, and a second neural network configured to set a speed of the vehicle based on comparing the compensation steering angle with a threshold, wherein the driving steering angle comprises steering angle information collected while the vehicle is being driven and the calculated steering angle comprises steering angle information learned by receiving the image and the driving speed.

16 Claims, 11 Drawing Sheets

(52) U.S. Cl.
CPC ..... *B60W 2552/40* (2020.02); *B60W 2710/20* (2013.01); *B60W 2720/10* (2013.01); *B60W 2720/12* (2013.01)

(58) Field of Classification Search
CPC ......... B60W 2720/10; B60W 2720/12; B60W 60/0018; B60W 2540/18; B60W 2552/30; B60W 2552/53; B60W 2710/207; B60W 50/085; B60W 50/12; B60W 30/146
See application file for complete search history.

(56) References Cited

U.S. PATENT DOCUMENTS

| | | | |
|---|---|---|---|
| 2006/0287817 | A1 | 12/2006 | Nagel |
| 2018/0232585 | A1* | 8/2018 | Kim ..................... G06V 20/584 |
| 2019/0086929 | A1 | 3/2019 | Tamboli et al. |
| 2019/0176818 | A1* | 6/2019 | Movert ................. G06N 3/045 |
| 2019/0271981 | A1* | 9/2019 | Oba ..................... G05D 1/0061 |
| 2020/0065665 | A1* | 2/2020 | Nageshrao ............... G06N 3/08 |
| 2020/0207412 | A1 | 7/2020 | Al Assad et al. |
| 2020/0406894 | A1* | 12/2020 | Akella ............... B60K 31/0066 |
| 2021/0004006 | A1* | 1/2021 | Graves .................. G05D 1/021 |

FOREIGN PATENT DOCUMENTS

| | | | | |
|---|---|---|---|---|
| CN | 110155031 | A | | 8/2019 |
| EP | 1 659 367 | A1 | | 5/2006 |
| EP | 3 219 564 | A1 | | 9/2017 |
| EP | 3219564 | A1 | * 9/2017 | ............ B60W 10/04 |
| EP | 3 495 219 | A1 | | 6/2019 |
| JP | 7-306998 | A | | 11/1995 |
| KR | 10-1439017 | B1 | | 10/2014 |
| KR | 10-2020-0084941 | A | | 7/2020 |

OTHER PUBLICATIONS

Chinese Office Action dated Jul. 1, 2023, in counterpart Chinese Patent Application No. 202111156549.6 (9 pages in English, 8 pages in Chinese).

* cited by examiner

←labeling→ HOST VEHICLE SPEED & COMPENSATION STEERING ANGLE

COMPENSATION STEERING ANGLE CALCULATION IS POSSIBLE WHEN HOST VEHICLE SPEED IS GIVEN

APPARATUS AND METHOD FOR CONTROLLING DRIVING OF VEHICLE

CROSS-REFERENCE TO RELATED APPLICATION

This application claims the benefit under 35 USC § 119(a) of Korean Patent Application No. 10-2020-0130246, filed in the Korean Intellectual Property Office on Oct. 8, 2020 and Korean Patent Application No. 10-2020-0136214, filed on Oct. 20, 2020, the entire contents of which are incorporated herein by reference for all purposes.

BACKGROUND

1. Field

The present disclosure relates to an apparatus and method for controlling driving of a vehicle.

2. Discussion of Related Art

In modern society, automobiles are the most common means of transportation, and the number of people using automobiles is increasing. There has been developed an advanced driver assistance system (ADAS) that provides more convenience and safety to drivers.

Typically, a system for predicting the front road environment by using map information, and providing appropriate control and convenience services has been commercialized.

In recent years, there has been developed an autonomous vehicle capable of reaching a destination by itself without a driver's manipulation of a steering wheel, an accelerator pedal, a brake, and the like.

For autonomous driving, a lane departure warning system (LDWS), a lane keeping assist system (LKAS), a blind side warning system (BSD), smart cruise control (SCC), and an automatic emergency braking system (AEB) must operate organically.

Modeling is performed using a dynamic differential equation related to the lateral motion of a vehicle during path following control using a conventional camera sensor.

When expressing a state space, the disturbance related to the curvature (or desired yaw rate) and the speed of the vehicle remains, and when following a curved road, the disturbance may cause input of an additional steering control value by compensating for a value pre-calculated by the feedforward control.

However, the corresponding disturbance may be offset to some extent by feedforward control, but all elements of the state vector may not be removed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus for controlling driving of a vehicle, the apparatus including a camera configured to acquire an image in front of a vehicle, a sensor configured to acquire a driving speed of the vehicle, a first neural network configured to calculate a compensation steering angle based on comparing a driving steering angle with a calculated steering angle, and a second neural network configured to set a speed of the vehicle based on comparing the compensation steering angle with a threshold, wherein the driving steering angle comprises steering angle information collected while the vehicle is being driven and the calculated steering angle comprises steering angle information learned by receiving the image and the driving speed.

The second neural network may be configured to increase the speed of the vehicle to a preset speed, in response to the compensation steering angle being less than or equal to the threshold, and decrease the speed of the vehicle to the preset speed, in response to the compensation steering angle exceeding the threshold.

The calculated steering angle may be based on obtaining a road model by receiving the image and the driving speed, and performing learning by calculating a road coefficient of the road model.

The first neural network may be configured to label and store the driving speed and the compensation steering angle in a corresponding image with respect to the image.

The first neural network may be configured to calculate the compensation steering angle based on the driving speed in a new image, in response to a road model of the new image matching the road model of the image labeled with the driving speed and the compensation steering angle.

The first neural network may be configured to calculate the compensation steering angle by applying a weight to a previously learned and stored compensation steering angle.

The preset speed may be preset by a smart cruise control function of the vehicle.

The second neural network may be configured to decrease the speed of the vehicle to a deceleration speed calculated by $V_{x,low}=\sqrt{\mu R g}$ in response to the compensation steering angle exceeding the threshold, where $V_{x,low}$ is the deceleration speed, 'μ' is a road friction coefficient, 'R' is a turning radius (the reciprocal of curvature among road coefficients), and 'g' is the gravitational acceleration.

In another general aspect, there is provided a processor-implemented method of controlling driving of a vehicle, the method including acquiring an image in front of a vehicle through a camera, acquiring a driving speed of the vehicle through a sensor, calculating, by a first neural network, a compensation steering angle based on comparing a driving steering angle with a calculated steering angle, and setting, by a second neural network, a speed of the vehicle based on comparing the compensation steering angle with a threshold, wherein the driving steering angle comprises steering angle information collected while the vehicle is being driven and the calculated steering angle comprises steering angle information learned by receiving the image and the driving speed.

The setting of the speed of the vehicle may include increasing the speed of the vehicle to a preset speed, in response to the compensation steering angle being less than or equal to the threshold, and decreasing the speed of the vehicle to the preset speed, in response to the compensation steering angle exceeding the threshold.

The calculating of the compensation steering angle may include obtaining a road model by receiving the image and the driving speed, and performing learning by calculating a road coefficient of the road model.

The calculating of the compensation steering angle may include labeling and storing the driving speed and the compensation steering angle in a corresponding image with respect to the image.

The calculating of the compensation steering angle may include calculating the compensation steering angle based on the driving speed in a new image, in response to a road model of the new image matching the road model of the image labeled with the driving speed and the compensation steering angle.

The calculating of the compensation steering angle may include calculating the compensation steering angle by applying a weight to a previously learned and stored compensation steering angle.

The preset speed may be preset by a smart cruise control function of the vehicle.

The decreasing of the speed of the vehicle may include decreasing the speed of the vehicle to a deceleration speed calculated by $V_{x,low}=\sqrt{\mu Rg}$ in response to the compensation steering angle exceeding the threshold, where the $V_{x,low}$ is the deceleration speed, the $\mu$ is a road friction coefficient, the R is a turning radius (the reciprocal of curvature among road coefficients), and the g is the gravitational acceleration.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

Figure 1:
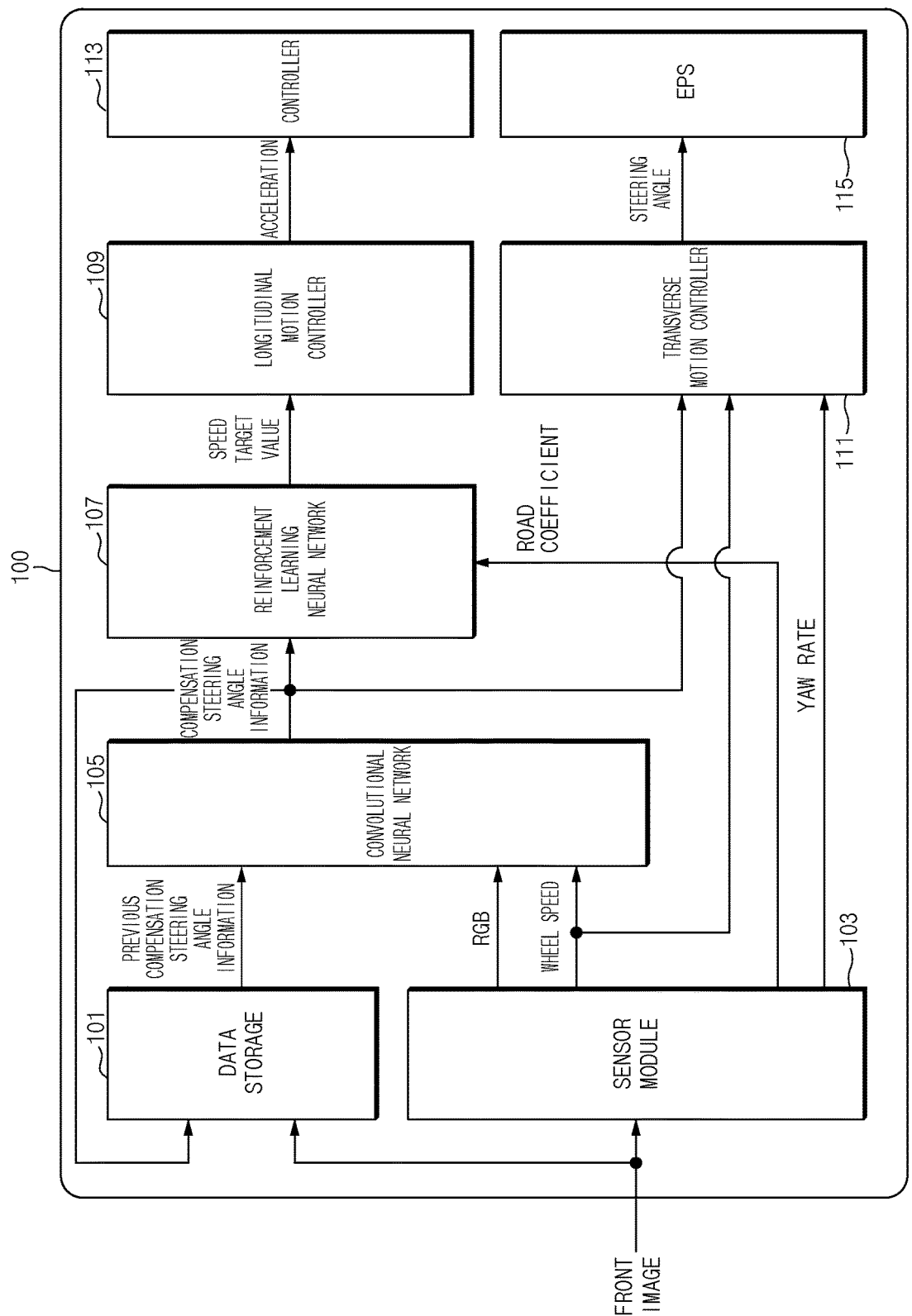
FIG. 1 is a block diagram illustrating an apparatus for controlling driving of a vehicle according to an embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Hereinafter, embodiments of the present disclosure will be described in detail with reference to FIGS. 1 to 4.

Figure 2:
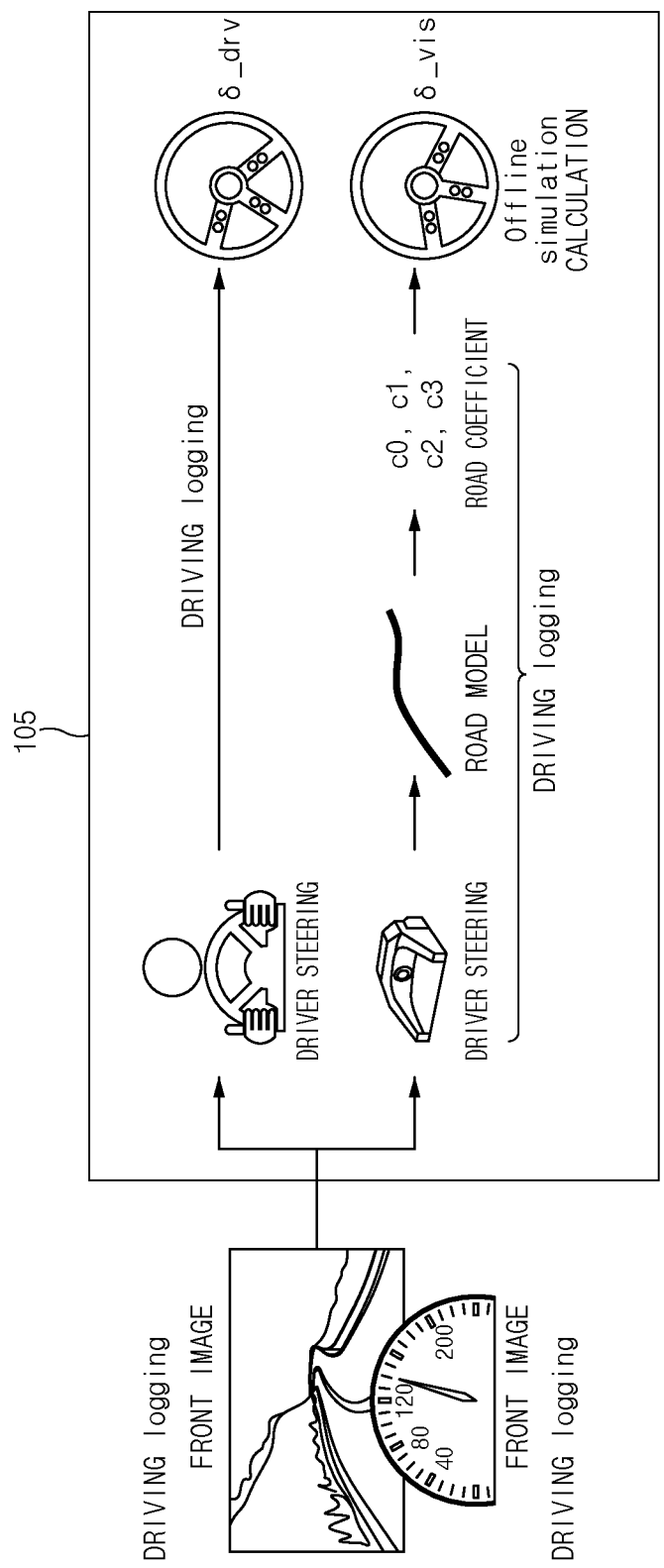
FIGS. 2 and 3 are diagrams illustrating a processing process of a convolutional neural network in an apparatus for controlling driving of a vehicle according to an embodiment of the present disclosure.
Figure 3:
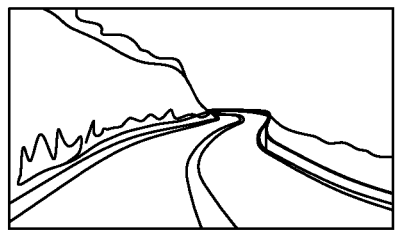
Figure 3:
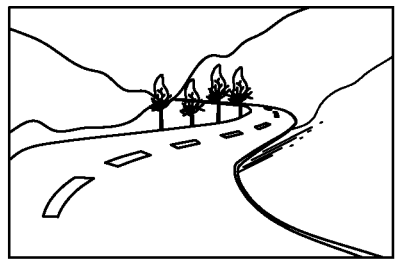
Figure 4:
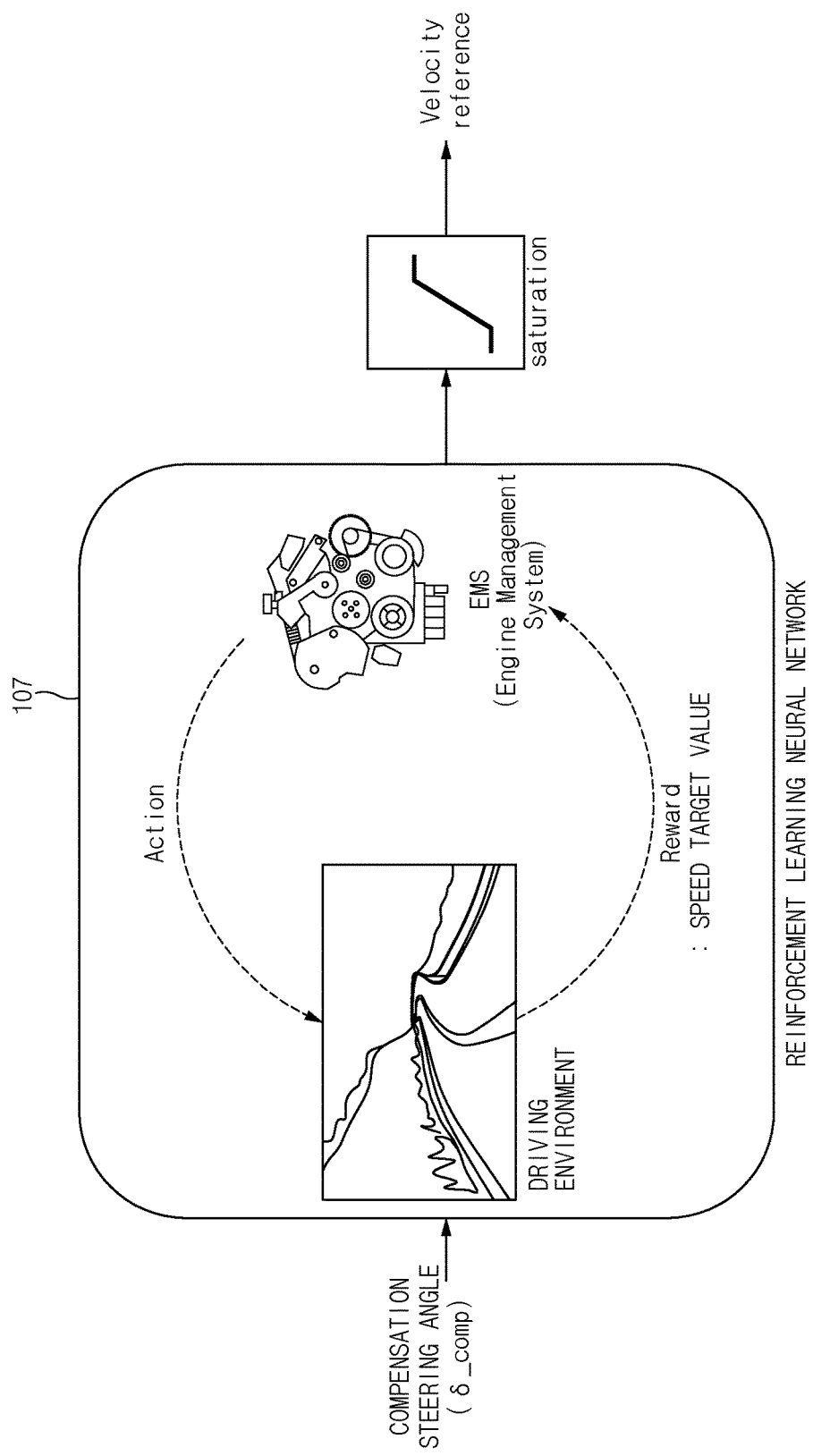
FIG. 4 is a diagram illustrating a processing process of a reinforcement learning neural network in an apparatus for controlling driving of a vehicle according to an embodiment of the present disclosure.

FIG. 1 is a block diagram illustrating an apparatus for controlling driving of a vehicle according to an embodiment of the present disclosure. FIGS. 2 and 3 are diagrams illustrating a processing process of a convolutional neural network in an apparatus for controlling driving of a vehicle according to an embodiment of the present disclosure. FIG. 4 is a diagram illustrating a processing process of a reinforcement learning neural network in an apparatus for controlling driving of a vehicle according to an embodiment of the present disclosure.

Referring to FIG. 1, an apparatus for controlling driving of a vehicle according to an embodiment of the present disclosure may include data storage 101, a sensor module 103, a convolutional neural network 105, a reinforcement learning neural network 107, a longitudinal controller 109, a transverse controller 111, an electronic speed controller (ESC) 113, and an electronic steering system (EPS) 115.

The sensor module 103 may include a camera, a wheel speed sensor, a yaw rate sensor, a steering sensor, and the like.

It is possible to obtain a front image of a vehicle 100 through the camera, obtain a driving speed of the vehicle 100 through the wheel speed sensor, obtain a yaw rate of the vehicle 100 through the yaw rate sensor, and detect a rotation angle of the vehicle 100 through the steering sensor.

A road coefficient may be calculated from a road image in front through various sensors constituting the sensor module 103.

The road coefficient, which is extracted by classifying the lines in the front image captured by the camera at regular intervals, and expressed as a relative position with the vehicle by approximating it to the curve of the $3^{rd}$-order equation on the plane coordinates, may represent the amount of change in the curvature of the road, the center of gravity of the vehicle, the curvature of the road, the difference in angle between the inclination of the tangent to the curvature of the road and the direction the vehicle is heading, the distance between the vehicle and the center of the lane in a transverse direction, and the like.

Referring to FIG. 2, the convolutional neural network 105, which includes a deep learning model such as a convolutional deep neural network (CNN), may receive the front image and driving speed of the vehicle 100 and compare differences between the driving steering angle and calculated steering angle to calculate a compensation steering angle.

The driving steering angle is information on the actual steering angle corresponding to the turning of the vehicle 100 while a driver drives the vehicle 100 on an actual curved road.

The calculated steering angle represents steering angle information on a curved road through learning by receiving the front image taken through the camera and the driving speed measured through the wheel sensor.

The convolutional neural network 105 may obtain a road model through the front image and driving speed, and may perform learning by calculating the road coefficient for the road model.

Referring to FIG. 3, after calculating the compensation steering angle, the convolutional neural network 105 may label the driving speed and the compensation steering angle in the corresponding front image, and stores it in the data storage 101. Thereafter, when a new front image is obtained in which the front image in which the driving speed and the compensation steering angle are labeled and stored while the vehicle is driven is matched with the road model, the compensation steering angle may be calculated based on the driving speed in the new front image.

In the forward image in which the driving speed and the compensation steering angle are labeled and stored through the convolutional neural network 105, the compensation steering angle may be a previously learned and stored compensation steering angle. When calculating a current compensation steering angle while the vehicle 100 is driven, the final compensation steering angle may be calculated by giving weights to the previous compensation steering angle and the current compensation steering angle, respectively.

For example, after calculating the current compensated steering angle through the convolutional neural network 105 while the vehicle 100 is driven on a curved road, a weight of 70% is given to the past compensated steering angle matched with the corresponding curved road, and 30% is given to the current compensated steering angle to calculate the final compensation steering angle, so that a more accurate compensation steering angle may be calculated.

Meanwhile, when the compensation steering angle is large, the steering of the vehicle 100 is compensated momentarily and abruptly, so that the driver may feel discomfort. The fact that the steering angle to be compensated is large is a case in which the disturbance value itself is large.

Accordingly, when the vehicle 100 steers quickly because the steering angle to be compensated for while following the center of the lane is large, the vehicle 100 may deviate from the lane due to centrifugal force, and the like and an accident may occur.

Referring to FIG. 4, the reinforcement learning neural network 107, which is to attenuate disturbance, may be set to increase the speed of the vehicle 100 up to a preset speed when the compensation steering angle is less than or equal to a specified threshold value, and to decrease the speed of the vehicle 100 up to a preset speed when the compensation steering angle exceeds the specified threshold value.

For example, when the threshold value of the compensation steering angle that allows the vehicle 100 to turn around on a curved road while following the center of a lane without the influence of centrifugal force is set to 10 degrees, and when the compensation steering angle calculated while the vehicle 100 travels on a curved road is 10 degrees or less, a target speed value (velocity reference) that may be increased corresponding to the compensation steering angle may be set through an engine management system (EMS).

That is, the speed of the vehicle 100 may be increased up to the compensation steering angle of 10 degrees. In this case, because there is a risk of an accident when the speed of the vehicle 100 continues to increase, the upper limit for the speed increase of the vehicle 100 may be set through a smart cruise control (SCC) function.

Therefore, even if the speed of the vehicle increases corresponding to the compensation steering angle, it is possible not to exceed the speed determined by the smart control cruise.

Meanwhile, when the compensation steering angle calculated while the vehicle 100 is driven on the curved road exceeds 10 degrees, the vehicle 100 may deviate from the lane by centrifugal force while turning around on the curved road, so that it is possible to reduce the speed of the vehicle 100 through an engine management system (EMS) in order to reduce disturbance.

In this case, because the vehicle 100 continues to decelerate and the vehicle must not be stopped, the deceleration speed $V_{x,low}$, which is a speed at which the vehicle 100 can travel by following the lane of the curved road without deviating by centrifugal force, may be set as the lower limit thereof.

The deceleration speed $V_{x,low}$ may be expressed as following Equation 1.

$$V_{x,low} = \sqrt{\mu R g} \quad \text{[Equation 1]}$$

Where the 'μ' is the road friction coefficient, the 'R' is the turning radius (the reciprocal of the curvature among the road coefficients), and the 'g' is the gravitational acceleration.

For reference, when the deceleration speed is smaller than the speed determined by the smart control cruise, the deceleration speed may be set to the speed determined by the smart control cruise.

The transverse controller 111 may receive the yaw rate and driving speed from the sensor module 103 and the compensation steering angle from the convolutional neural network 105 in order to control the driving of the EPS 115 to allow the vehicle 100 to turn at the corresponding steering angle.

The longitudinal controller 109 may receive the increase or decrease speed from the reinforcement learning neural network 107 and control the driving of the ESC 113 such that the vehicle 100 can travel at the corresponding speed.

Hereinafter, a method of controlling driving of a vehicle according to another embodiment of the present disclosure will be described in detail with reference to FIG. 5.

Figure 5:
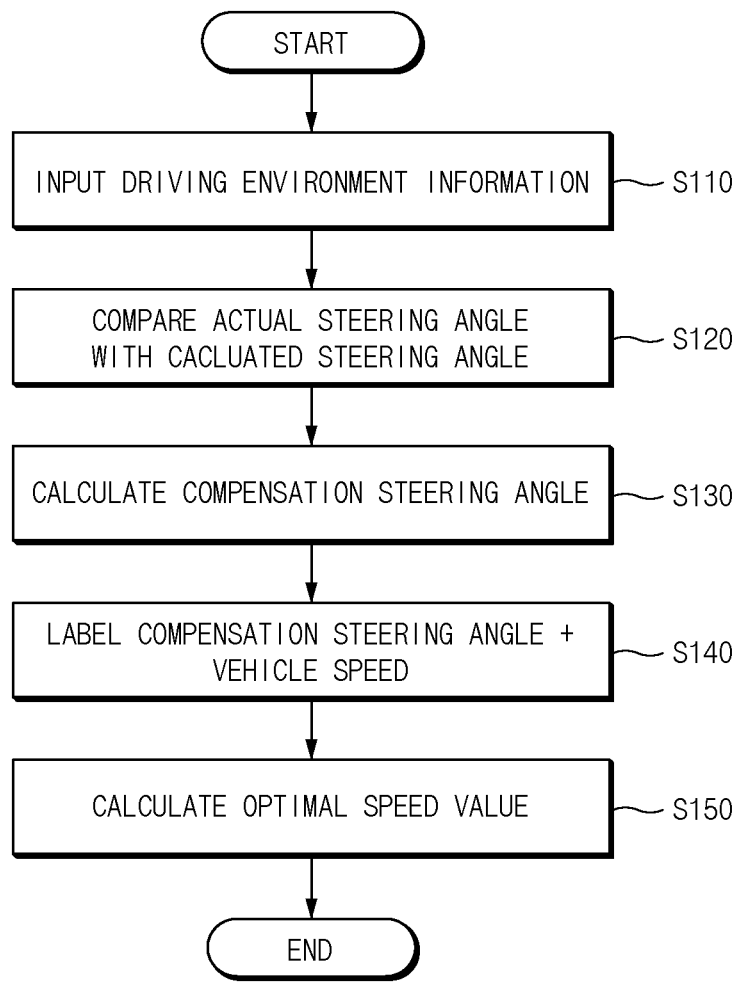
FIG. 5 is a flowchart illustrating a method of controlling driving of a vehicle according to an embodiment of the present disclosure.

FIG. 5 is a flowchart illustrating a method of controlling driving of a vehicle according to an embodiment of the present disclosure.

Hereinafter, it is assumed that an apparatus for compensating for disturbance performs the process of FIG. 5 when driving on the curved road of FIG. 1.

First, in S110, a front image of the vehicle 100 may be obtained through a camera, and a driving speed of the vehicle 100 may be obtained through a sensor.

Next, in S120 and S130, in the convolutional neural network 105, the driving steering angle, which is the steering angle information collected while the vehicle 100 is travelling, and the calculated steering angle, which is the steering angle information learned by receiving the front image and the driving speed, are compared with each other to calculate a compensation steering angle.

After calculating the compensated steering angle, in S140, the convolutional neural network 105 may label the driving speed and the compensation steering angle in the corresponding front image and store it in the data storage 101.

Next, in S150, in the reinforcement learning neural network 107, when the compensation steering angle is less than or equal to a preset threshold value, the speed of the vehicle 100 is set to increase up to a preset speed, and when the compensation steering angle exceeds the preset threshold value, the speed of the vehicle 100 may be set to decrease up to a preset speed.

Next, when receiving the yaw rate and travel speed from the sensor module 103 and the compensation steering angle from the convolutional neural network 105, the transverse controller 111 may control the driving of the EPS 115 such that the vehicle 100 turns at the corresponding steering angle. When receiving the increase or decrease speed from the reinforcement learning neural network 107, the longitudinal controller 109 may control the driving of the ESC 113 such that the vehicle 100 travels at the corresponding speed.

As described above, according to the present disclosure, it is possible to use deep learning of the front image to compensate for disturbance generated when following a curved road.

Because the disturbance compensation value calculated through deep learning is learned through the experimental value of the driver's driving data, it may have less heterogeneity compared to the compensation value calculated based on the simplified dynamics model. In addition, when a large amount of data is learned, it may be possible to compensate for disturbance in various curved roads.

Because the disturbance includes a value for the vehicle speed, it is possible to reduce the driver's anxiety by calculating the optimal speed value through reinforcement learning and at the same time reduce the value to be compensated for.

Hereinafter, other embodiments of the present disclosure will be described in detail with reference to FIGS. 6 to 11.

A sensing device 10, a recognizing device 20, a determining device 30, a setting device 40, a control device 50, and a display device 60 according to another embodiment of the present disclosure may be implemented with non-volatile memory (not shown) configured to store data relating to an algorithm configured to control operations of various components of the vehicle or software instructions for reproducing the algorithm, and a processor (not shown) configured to perform the operations described below by using the data stored in a corresponding memory. In this case, the memory and processor may be implemented as separate chips. Alternatively, the memory and processor may be implemented as a single chip integrated with each other. The processor may include one or more processors.

Figure 6:
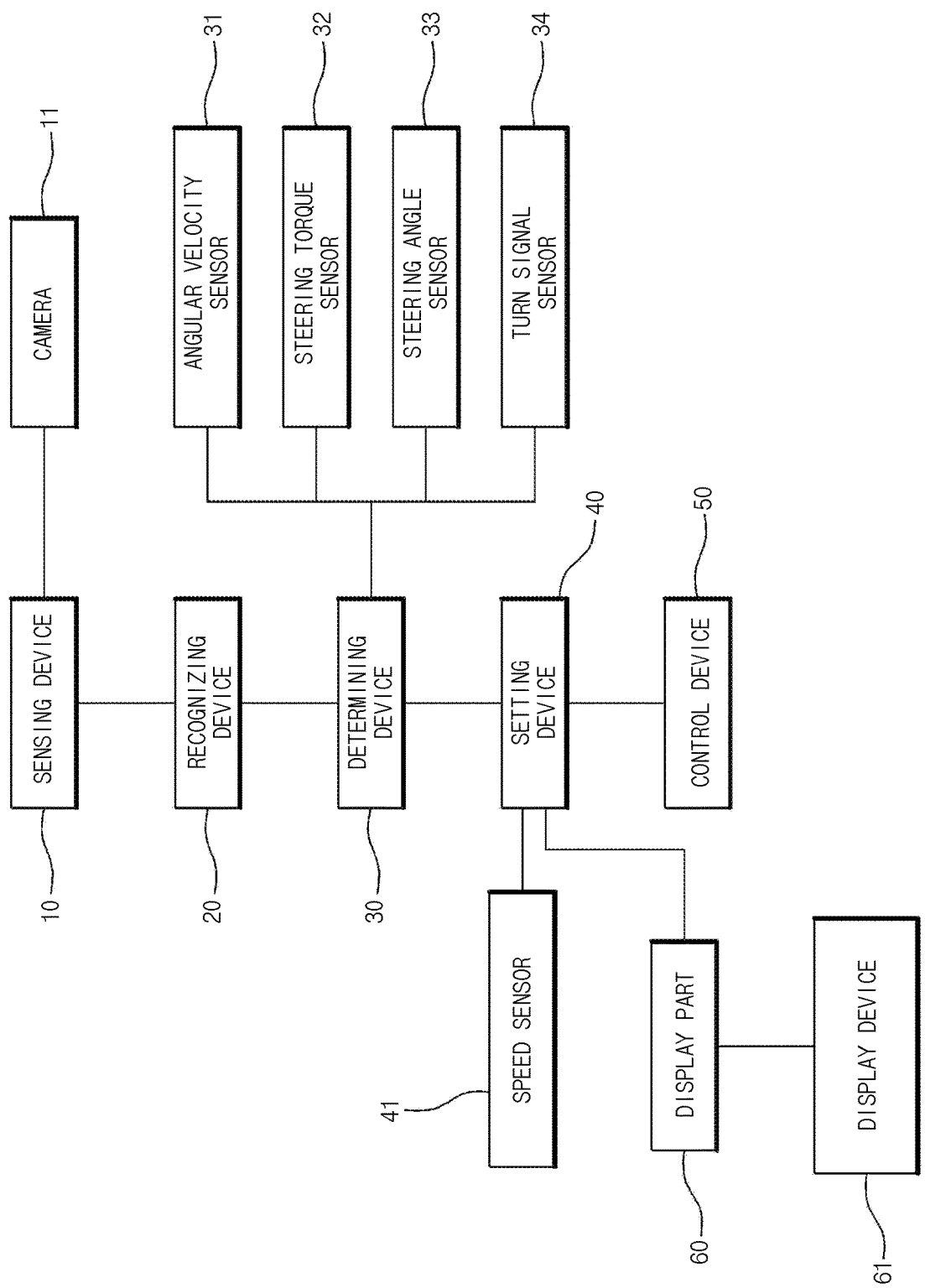
FIG. 6 is a block diagram illustrating an apparatus for controlling driving of a vehicle according to another embodiment of the present disclosure.
Figure 7:
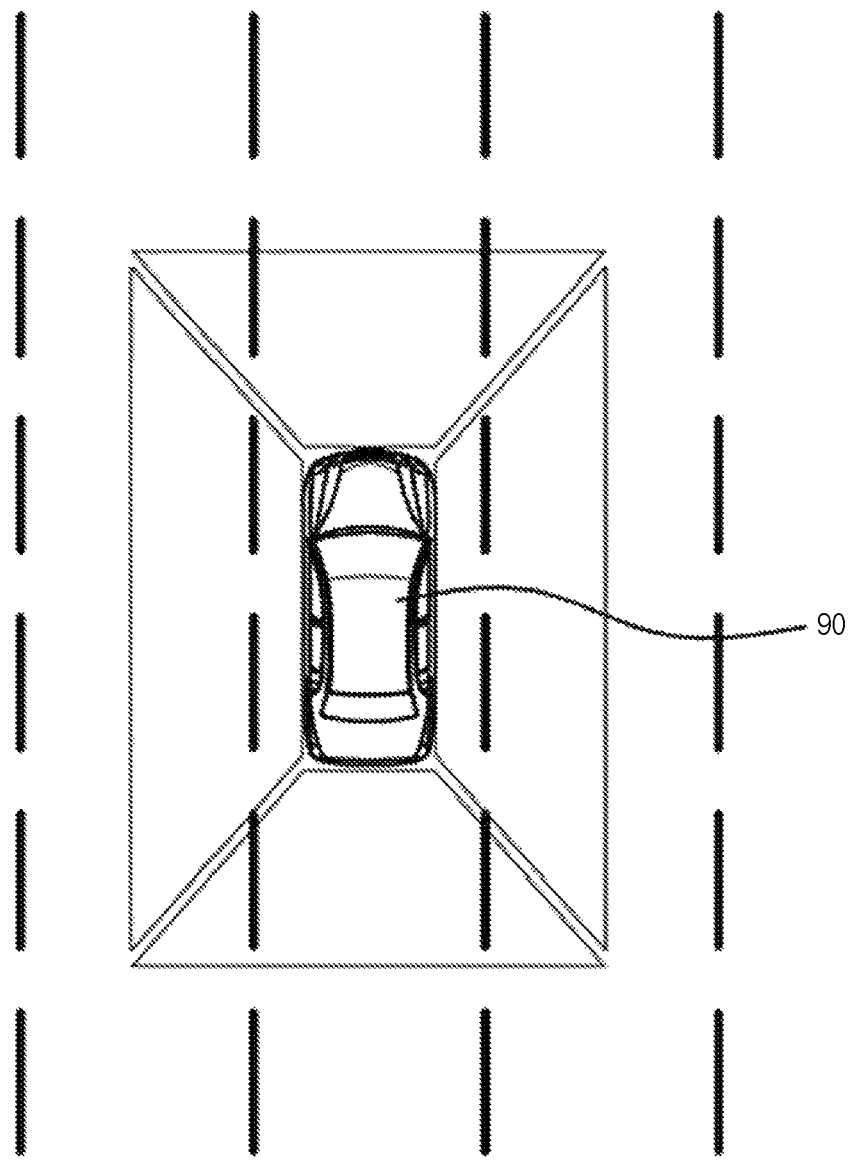
FIG. 7 is a diagram illustrating a detection range of an apparatus for controlling driving of a vehicle according to another embodiment of the present disclosure.
Figure 8:
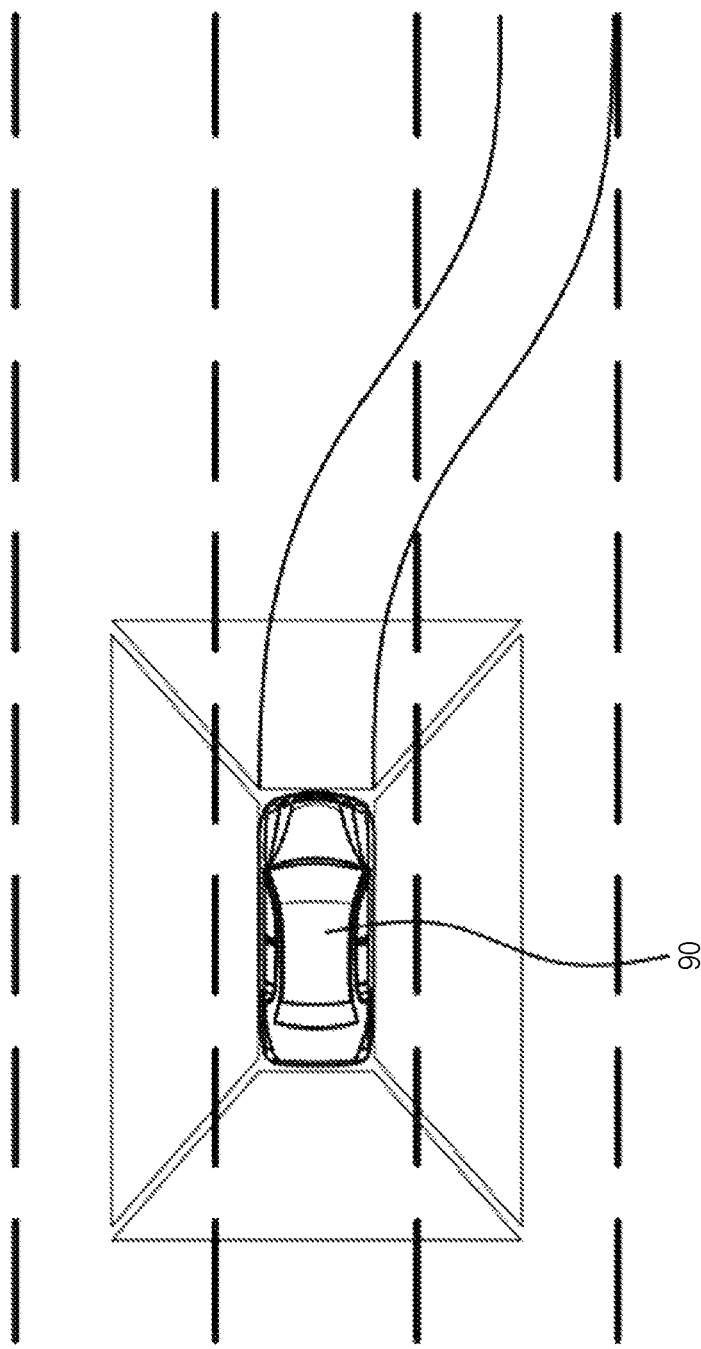
FIG. 8 is a diagram illustrating a movement path when an apparatus for controlling driving of a vehicle according to another embodiment of the present disclosure changes a lane.

FIG. 6 is a block diagram illustrating an apparatus for controlling driving of a vehicle according to another embodiment of the present disclosure. FIG. 7 is a diagram illustrating a detection range of an apparatus for controlling driving of a vehicle according to another embodiment of the present disclosure. FIG. 8 is a diagram illustrating a movement path when an apparatus for controlling driving of a vehicle according to another embodiment of the present disclosure changes a lane.

An apparatus for controlling driving of a vehicle according to another embodiment of the present disclosure may assist in lane change when changing the lane of a vehicle 90 or may control the vehicle 90 to change the lane.

An apparatus for controlling driving of a vehicle according to another embodiment of the present disclosure may be applied to a general vehicle or an autonomous vehicle. When applied to a general vehicle, the apparatus for controlling driving of a vehicle may guide a driver with a movement path. When applied to an autonomous vehicle, the apparatus for controlling driving of a vehicle may control driving of the vehicle along the movement path.

An apparatus for controlling driving of a vehicle according to another embodiment of the present disclosure may include the sensing device 10 for detecting a line of a lane in which the vehicle 90 travels, the recognizing device 20 for recognizing change in a lateral distance between the detected line and the vehicle 90, the determining device 30 for determining lane change intention based on the change in the lateral distance between the detected line and the vehicle 90, which recognized by the recognizing device 20, and the setting device 40 for setting a movement path for lane change of the vehicle 90 based on the lane change intention determined by the determination device 30.

Referring to FIGS. 6 to 8, the sensing device 10 may detect a line in which the vehicle 90 travels by sensing the surroundings of the vehicle 90.

The recognizing device 20 may recognize the change in the lateral distance between the line and the vehicle 90 by calculating the lateral distance between the line detected by the sensing device 10 and the vehicle 90.

The determining device 30 may determine the lane change intention in which the vehicle 90 moves to the left or right to change the lane, based on the lateral distance between the line recognized by the recognizing device 20 and the vehicle 90.

The determining device 30 determines that the vehicle 90 changes to the left lane when the recognizing device 20 recognizes that the distance between the left lane of the vehicle 90 and the vehicle 90 is getting closer. When the recognizing device 20 recognizes that the distance between the right lane of the vehicle 90 and the vehicle 90 is getting closer, it may be determined that the vehicle changes to a right lane.

The setting device 40 may set the movement path in the lane change direction of the vehicle 90 based on whether the lane change is determined by the determining device 30.

Thus, by setting the lane change movement path of the vehicle 90, it is possible to allow the vehicle 90 to safely change a lane or assist in lane change.

The sensing device 10 may be mounted on the vehicle 90 to be connected to the camera 11 that photographs surroundings of the vehicle 90, and may detect the lines on both sides of the vehicle 90 by using the image taken by the camera 11.

Referring to FIG. 7, the sensing device 10 may be connected to the camera 11 sensor mounted on the vehicle 90 to photograph the surroundings of the vehicle 90 in real time, and may detect a line based on the image information photographed by the camera 11 sensor.

In addition, the sensing device 10 may detect an obstacle adjacent to the vehicle 90 based on the image information photographed by the camera 11 sensor.

The sensing device 10 may detect the color and type of a lane by classifying the lane by color and type, and the determining device 30 may determine whether the lane change of the vehicle 90 is operable based on the color and type of the lane detected by the sensing device 10.

The sensing device 10 may detect the color or type of a lane based on the image information photographed by the camera 11 sensor. The vehicle 90 may perform the lane change based on the color and type of the lane, and the determining device 30 may determine whether to perform the lane change of the vehicle 90 based on the color and type of the lane.

Accordingly, when a lane is detected as a solid line, a double solid line, or a yellow line, it is impossible to change a lane, and a lane change is possible only when the lane is a white broken line.

The sensing device 10 may detect an external obstacle adjacent to the vehicle 90, and the determining device 30 may determine whether the lane change of the vehicle 90 is possible based on the external obstacle adjacent to the vehicle 90 detected by the sensing device 10.

The sensing device 10 may detect an external obstacle adjacent to the vehicle 90 through the camera 11 mounted on the vehicle 90. The external obstacle may include an object, such as an external vehicle located adjacent to the host vehicle, a curb, a street tree, or the like, that makes it impossible to change the lane of the vehicle 90.

The determining device 30 may determine that it is impossible to change the lane of the vehicle 90 when the external obstacle detected by the sensing device 10 is located adjacent to the vehicle 90.

Figure 9:
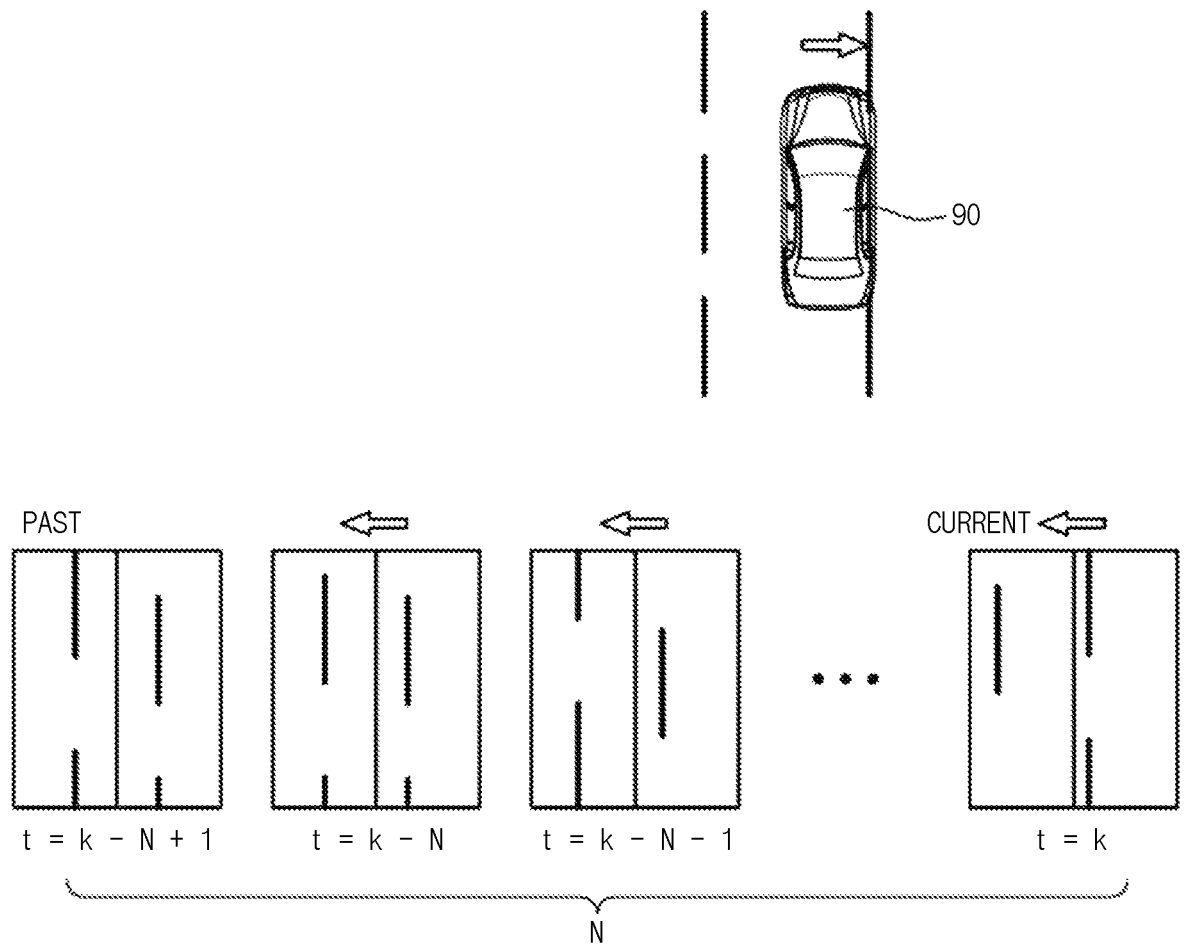
FIG. 9 is a diagram illustrating that the recognition device of an apparatus for controlling driving of a vehicle according to another embodiment of the preset disclosure recognizes the lane change through the movement of the lane detected by the detecting device.

FIG. 9 is a diagram illustrating that the recognition device of an apparatus for controlling driving of a vehicle according to another embodiment of the preset disclosure recognizes the lane change through the movement of the lane detected by the detecting device.

The view showing a lane in FIG. 9 illustrates a situation in which a lane is located in a detection range shown in FIG. 7.

The determining device 30 may deep-learn a distance change with time between the vehicle 90 and the lane recognized by the recognizing device 20 when there is an intention to change the lane.

Referring to FIG. 9, the determining device 30 may deep-learn the lateral distance between the vehicle 90 and the lane recognized by the recognizing device 20 in time sequence. Thus, the determining device 30 may quickly determine whether the line change of the vehicle 90 occurs.

The control device 50 for controlling the driving of the vehicle 90 along a virtual lane set by the setting device 40 or generating a warning signal when the vehicle 90 departs from a line detected by the sensing device 10 may be further included.

In the case of an autonomous vehicle, the control device 50 may change the lane by controlling the driving of the vehicle 90 along the lane change movement path set by the setting device 40.

In addition, in the case of a general vehicle, when it is detected that the lane is changed due to the curve of the lane when the driver does not intend to change the lane, a warning signal may be generated to the driver so that the driver may focus on driving.

Thus, it is possible to reduce the probability of a collision accident of a vehicle.

In a state where the intention to change lanes is not determined by the determining device 30, when the recognizing device 20 recognizes a change in the lateral distance between the line and the vehicle 90, the control device 50 may generate a line maintenance warning signal, or control the steering of the vehicle 90 to maintain the line detected by the sensing device 10.

When the line is curved, the lateral distance between the line and the vehicle 90 may be closer due to the driver's carelessness. When the recognizing device 20 recognizes the change in the lateral distance between the line and the vehicle 90, in the case of a general vehicle, the control device 50 may generate a line maintenance warning to the driver so that the driver may concentrate more on driving. In addition, in the case of an autonomous vehicle, the control device 50 may control the driving of the vehicle 90 to maintain the current line detected by the sensor device 10.

Accordingly, it is possible to reduce the probability of occurrence of a vehicle collision accident.

The determining device 30 may determine whether it is possible to change the lane of the vehicle 90 based on the line detected by the sensing device 10. When the determining device 30 determines that there is an intention to change the lane of the vehicle 90 and that it is impossible to change the lane, the control device 50 may send the line maintenance warning signal to the driver or control the steering of the vehicle 90 based on the line detected by the sensing device 10.

In a state in which the driver recognizes the lane change, the determining device 30 may determine whether the vehicle 90 can change to a lane based on the type or color of the line detected by the sensing device 10. When it is determined that it is impossible that the vehicle changes the lane, the controller 50 may control the vehicle 90 to maintain the current line detected by the sensing device 10, or may send a warning signal to the driver.

In addition, the sensing device 10 may recognize an obstacle around the vehicle 90, and the determining device 30 may determine whether the vehicle 90 can change the lane based on it.

Accordingly, it is possible to reduce the probability of occurrence of a vehicle collision accident.

The determining device 30 may be connected to an angular velocity sensor 31, a steering torque sensor 32, a steering angle sensor 33 or a turn signal device 34 mounted on the vehicle 90, and determine the intention to change the lane based on the steering information that is received from the angular velocity sensor 31, the steering torque sensor 32, the steering angle sensor 33, or the turn signal device 34.

Separately from the recognizing device 20 recognizing whether to change the lane, the determining device 30 may be connected to the angular velocity sensor 31, the steering torque sensor 32, the steering angle sensor 33 or the turn signal device 34 to recognize the lane change of the vehicle 90 based on the steering information detected by the angular velocity sensor 31, the steering torque sensor 32 or the steering angle sensor 33 or the steering information input from the turn signal device 34.

The angular velocity sensor 31 may measure a yaw angular velocity. Because, when an under steer or over steer occurs in the vehicle 90, the vehicle 90 is not in a state that can make a normal turn, the determining device 30 is not in a state that can make a normal turn when under steer or over steer occurs in the vehicle 90, when the yaw angular velocity detected by the angular velocity sensor 31 is adjacent to or equal to a preset yaw angular velocity, the determining device 30 may determine that the vehicle 90 turns normally and recognize whether to change the lane.

The steering torque sensor 32 or the steering angle sensor 33 may be connected to the steering device of the vehicle 90 to detect that the driver rotates the steering wheel, and the determining device 30 may recognize whether to change the lane based on it.

The setting device 40 is connected to a speed sensor 41 of the vehicle 90 to set a longitudinal length or curvature of an extended virtual line to change the lane based on the speed of the vehicle 90.

Referring to FIG. 8, the setting device 40 may set a movement path, and be connected to a speed sensor 41 mounted on the vehicle 90 to set the longitudinal length of the movement path or the curvature of the movement path.

When the speed of the vehicle 90 is high, the setting device 40 may set the longitudinal distance to be relatively long, or set the curvature of the movement path to be relatively small.

In addition, when the speed of the vehicle 90 is low, the setting device 40 may set the longitudinal distance to be relatively short, or set the curvature of the movement path to be relatively large.

Thus, the setting device 40 may safely change the lane of a vehicle by setting the movement path when changing a lane.

A display part 60 may be further included to display the movement path set by the setting device 40 through a display device 61 mounted on the vehicle 90.

Figure 10:
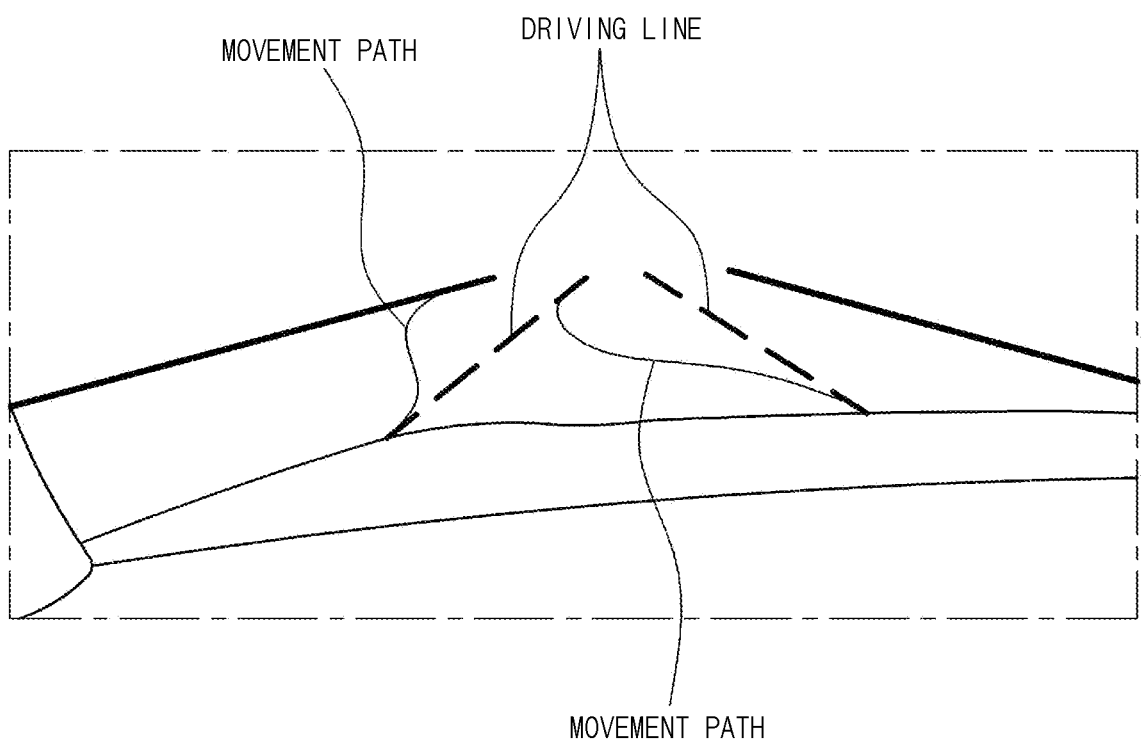
FIG. 10 is a diagram illustrating a movement path through a display in an apparatus for controlling driving of a vehicle according to another embodiment of the present disclosure.

FIG. 10 is a diagram illustrating a movement path through a display in an apparatus for controlling driving of a vehicle according to another embodiment of the present disclosure.

Referring to FIG. 10, the display device 61 such as a head up display (HUD) or a monitor that displays vehicle information may be installed in the vehicle 90, and in the case of a general vehicle, the display part 60 may display the lane change movement path set by the setting device 40 on the display device 61 as shown in FIG. 10.

Accordingly, it is possible to assist the driver in driving.

Figure 11:
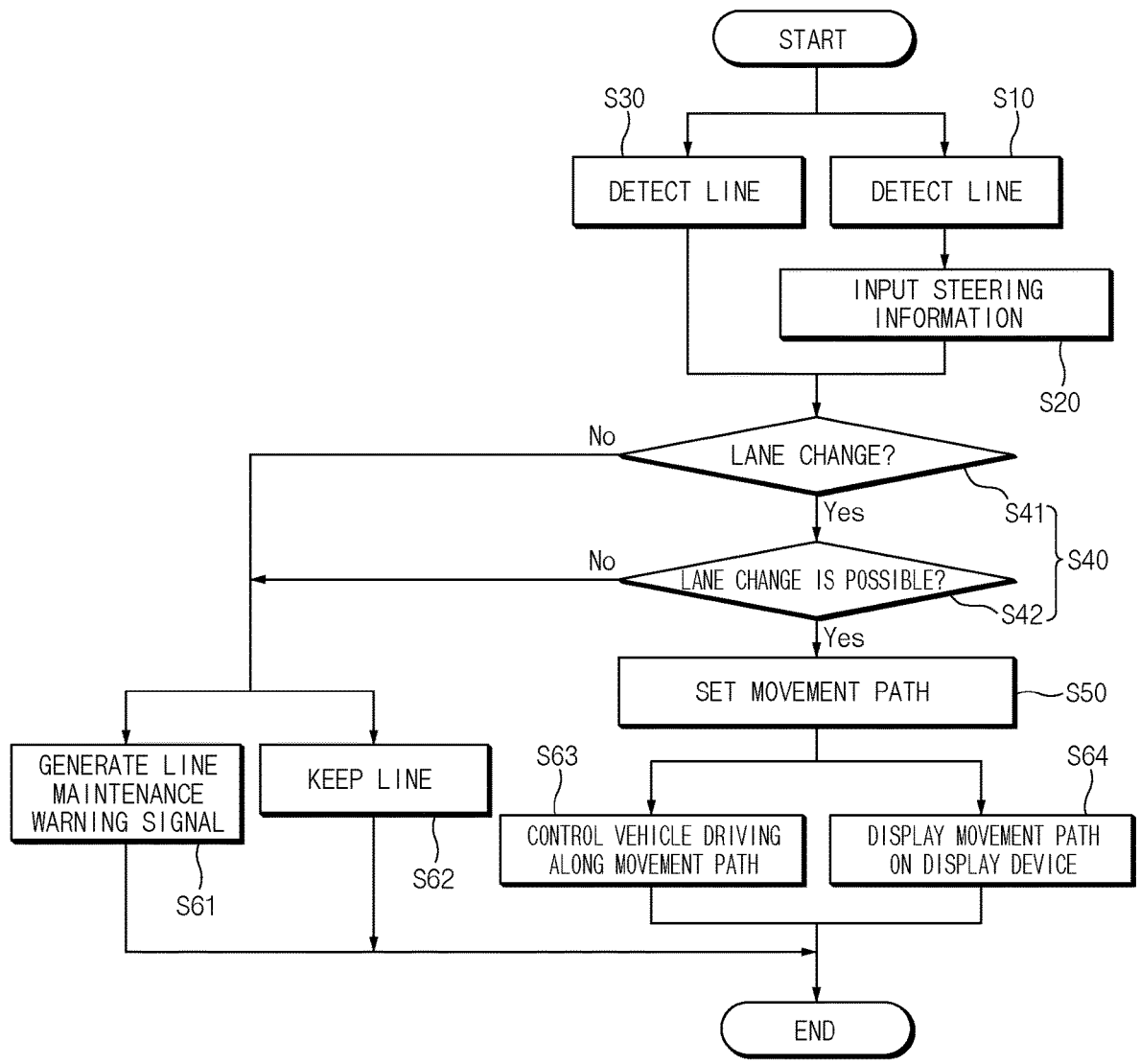
FIG. 11 is a flowchart illustrating a method of controlling driving of a vehicle according to another embodiment of the present disclosure.

FIG. 11 is a flowchart illustrating a method of controlling driving of a vehicle according to another embodiment of the present disclosure. A preferred example of a method of controlling driving of a vehicle according to another embodiment of the present disclosure will be described with reference to FIG. 11.

A method of controlling driving of a vehicle according to another embodiment of the present disclosure may include S10 of detecting a line of a lane in which the vehicle 90 travels, S20 of recognizing a change in the lateral distance between the vehicle 90 and the line detected in S20, S40 of determining an intention to change a lane based on a change in the lateral distance between the vehicle 90 and the line recognized in S40, and S50 of setting a movement path for lane change of the vehicle 90 based on the lane change intention determined in S40.

In S10, the lines on both sides of the vehicle 90 may be detected using the image taken by the camera 11 mounted on the vehicle 90 to photograph the surroundings of the vehicle 90.

The line is classified by color and type and detected in S10, and it is possible to determine in the determining operation whether the lane change of the vehicle 90 is possible based on the color and type of the line detected in the detecting operation.

In S40, it is possible to deep-learn the change in the distance with time between the vehicle 90 and the line recognized in the recognizing operation when there is an intention to change the lane.

S63 of controlling the driving of the vehicle 90 along the virtual line set in S50 may be further included.

S61 of generating the line maintenance warning signal and S62 of controlling the steering of the vehicle 90 to maintain the line detected in S10 may be further included. When the lane change intention is not determined in S41 and the lane change is detected in step S10, S62 may be executed.

S61 of generating the line maintenance warning signal and S62 of controlling the steering of the vehicle 90 to maintain the line detected in S10 may be further included. In S50, it is possible to determine whether the lane change of the vehicle 90 is possible based on the line detected in S10. When it is determined in S41 that there is a lane change intention and it is determined in S42 that the lane change is impossible, S61 and S62 may be executed.

S30 of receiving steering information from the angular velocity sensor 31, the steering torque sensor 32, the steering angle sensor 33 or the turn signal device 34 mounted on the vehicle 90 before S40 may be further included. In S40, it is possible to determine the lane change intention based on the steering information (S41).

In S50, the longitudinal length or curvature of the extended virtual line may be set in connection with the speed sensor 41 of the vehicle 90 to change the lane based on the speed of the vehicle 90.

S64 of displaying the movement path set in S50 through the display device 61 mounted on the vehicle 90 may be further included.

According to the present technology, it is possible to compensate for disturbance that occurs when following a curved road by using deep learning of a front image.

An apparatus and method for controlling driving of a vehicle capable of compensating for disturbance that occurs when following a curved road using deep learning of a front image are provided.

In addition, various effects that are directly or indirectly understood through the present disclosure may be provided.

The devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of controlling driving of a vehicle. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for controlling driving of a vehicle, the apparatus comprising:
    a camera configured to acquire an image in front of a vehicle;
    a sensor configured to acquire a driving speed of the vehicle;
    a first neural network configured to calculate a compensation steering angle based on comparing a driving steering angle with a calculated steering angle; and
    a second neural network configured to set a speed of the vehicle based on comparing the compensation steering angle with a threshold,
    wherein the driving steering angle comprises steering angle information collected while the vehicle is being driven and the calculated steering angle comprises steering angle information learned by receiving the image and the driving speed.

2. The apparatus of claim 1, wherein the second neural network is further configured to:
    increase the speed of the vehicle to a preset speed, in response to the compensation steering angle being less than or equal to the threshold; and
    decrease the speed of the vehicle to the preset speed, in response to the compensation steering angle exceeding the threshold.

3. The apparatus of claim 2, wherein the preset speed is preset by a smart cruise control function of the vehicle.

4. The apparatus of claim 2, wherein the second neural network is further configured to decrease the speed of the vehicle to a deceleration speed calculated by $V\_(x,low)$ $=\sqrt{\mu Rg}$ in response to the compensation steering angle exceeding the threshold, where $V\_(x,low)$ is the deceleration speed, 'µ' is a road friction coefficient, 'R' is a turning radius (a reciprocal of curvature among road coefficients), and 'g' is a gravitational acceleration.

5. The apparatus of claim 1, wherein the calculated steering angle is based on obtaining a road model by receiving the image and the driving speed, and performing learning by calculating a road coefficient of the road model.

6. The apparatus of claim 1, wherein the first neural network is further configured to label and store the driving speed and the compensation steering angle in a corresponding image with respect to the image.

7. The apparatus of claim 6, wherein the first neural network is further configured to calculate the compensation steering angle based on the driving speed in a new image, in response to a road model of the new image matching the road model of the image labeled with the driving speed and the compensation steering angle.

8. The apparatus of claim 1, wherein the first neural network is configured to calculate the compensation steering angle by applying a weight to a previously learned and stored compensation steering angle.

9. A processor-implemented method of controlling driving of a vehicle, the method comprising:
    acquiring an image in front of a vehicle through a camera;
    acquiring a driving speed of the vehicle through a sensor;
    calculating, by a first neural network, a compensation steering angle based on comparing a driving steering angle with a calculated steering angle; and
    setting, by a second neural network, a speed of the vehicle based on comparing the compensation steering angle with a threshold,
    wherein the driving steering angle comprises steering angle information collected while the vehicle is being driven and the calculated steering angle comprises steering angle information learned by receiving the image and the driving speed.

10. The method of claim 9, wherein the setting of the speed of the vehicle comprises:
    increasing the speed of the vehicle to a preset speed, in response to the compensation steering angle being less than or equal to the threshold; and
    decreasing the speed of the vehicle to the preset speed, in response to the compensation steering angle exceeding the threshold.

11. The method of claim 10, wherein the preset speed is preset by a smart cruise control function of the vehicle.

12. The method of claim 10, wherein the decreasing of the speed of the vehicle comprises:
    decreasing the speed of the vehicle to a deceleration speed calculated by $V\_(x,low)=\sqrt{\mu} Rg$ in response to the compensation steering angle exceeding the threshold, where the $V\_(x,low)$ is the deceleration speed, µ is a road friction coefficient, R is a turning radius (a reciprocal of curvature among road coefficients), and g is a gravitational acceleration.

13. The method of claim 9, wherein the calculating of the compensation steering angle comprises:
    obtaining a road model by receiving the image and the driving speed, and performing learning by calculating a road coefficient of the road model.

14. The method of claim 9, wherein the calculating of the compensation steering angle comprises:
    labeling and storing the driving speed and the compensation steering angle in a corresponding image with respect to the image.

15. The method of claim 14, wherein the calculating of the compensation steering angle comprises:
    calculating the compensation steering angle based on the driving speed in a new image, in response to a road model of the new image matching the road model of the image labeled with the driving speed and the compensation steering angle.

16. The method of claim 9, wherein the calculating of the compensation steering angle comprises:
    calculating the compensation steering angle by applying a weight to a previously learned and stored compensation steering angle.

\* \* \* \* \*